(12) United States Patent
Velke

(10) Patent No.: US 6,736,118 B1
(45) Date of Patent: May 18, 2004

(54) FUEL DENSITY REDUCTION METHOD AND DEVICE TO IMPROVE THE RATIO OF OXYGEN MASS VERSUS FUEL MASS DURING IGNITION IN COMBUSTION MECHANISMS OPERATING WITH FLUID HYDROCARBON FUELS

(76) Inventor: William H. Velke, P.O. Box 154 277 Campbellville Road, Campbellville, Ontario (CA), L0P 1B0

(*) Notice: Subject to any disclaimer, the term of this patent is extended or adjusted under 35 U.S.C. 154(b) by 0 days.

(21) Appl. No.: 10/293,357

(22) Filed: Nov. 14, 2002

(51) Int. Cl.⁷ .............................................. F02M 31/00
(52) U.S. Cl. ..................... 123/550; 123/557; 123/542
(58) Field of Search .................. 123/557, 542, 123/550

(56) References Cited

U.S. PATENT DOCUMENTS

| | | | | |
|---|---|---|---|---|
| 4,058,096 A | * | 11/1977 | Brown | 123/542 |
| 5,375,580 A | * | 12/1994 | Stolz et al. | 123/542 |
| 5,443,053 A | * | 8/1995 | Johnson | 123/557 |
| 6,112,713 A | * | 9/2000 | Kiel | 123/557 |
| 6,314,949 B1 | * | 11/2001 | DeGrazia, Jr. et al. | 123/542 |
| 6,408,831 B1 | * | 6/2002 | Craig et al. | 123/542 |
| 6,557,535 B2 | * | 5/2003 | Stone | 123/557 |

* cited by examiner

Primary Examiner—Marguerite McMahon

(57) ABSTRACT

A method and device for changing the rate of density between fluid hydrocarbon fuels and combustion air prior to ignition and combustion in residential, commercial and industrial combustion mechanisms, by extracting heat from the mechanism's combustion zone or flue area to reduce the density of the fuel prior to delivery to the mechanism burner at a constant, pre-set operating temperature of between 100 degrees Fahrenheit and the fuel's flash point temperature, while at the same time providing means to control combustion air temperature to a level such as to increase air density and significantly changing the mass ratio of fuel mass versus combustion air mass, hence oxygen mass, without increasing combustion air volume or fuel volume, thereby improving combustion efficiency, heat transfer efficiency and reduction in harmful stack emissions.

26 Claims, 2 Drawing Sheets

FUEL DENSITY REDUCTION METHOD AND DEVICE TO IMPROVE THE RATIO OF OXYGEN MASS VERSUS FUEL MASS DURING IGNITION IN COMBUSTION MECHANISMS OPERATING WITH FLUID HYDROCARBON FUELS

FIELD OF THE INVENTION

The present invention relates to the improvement in combustion efficiency of conventional fluid hydrocarbon fuels, such as natural gas or propane gas and the like when employed as fuel for residential, commercial and industrial space heating or cooling equipment, or for process heating, smelting or generating equipment and turbines, whereby such combustion efficiency improvement is obtained through a change in the mass ratio of fuel versus combustion air such as to effectively increase the available oxygen mass relative to fuel mass during ignition.

BACKGROUND OF THE INVENTION

It is generally recognized that the combustion process of conventional fluid hydrocarbon fuels is improved if additional oxygen is introduced into the combustion air/fuel gas mixture at the time of ignition. It is further recognized that the manipulated infusion of additional oxygen into the combustion air/fuel gas mixture is only possible in connection with additional energy expenditure to perform such task.

The Transportation Technologies/Heavy Vehicles Industry is presently investigating the use of natural gas as an alternative fuel for the transportation sector. To improve the power output of such natural gas engines, it is testing a second-stage intercooler for LNG (liquid natural gas) fueled heavy vehicles. The concept uses the LNG fuel to cool the intake air to increase combustion air density relative to fuel density and thereby achieving better engine performance, but without stating any specific temperature level.

The Power Generation Industry is now starting to provide a way of getting more energy from a gas turbine power plant by cooling down the combustion air. Cooling the gas turbine combustion air makes it denser, increasing the mass flow of oxygen for combustion relative to the fuel mass flow. Employing special evaporative air coolers which are attractive to gas turbine operator. Improvements for gas turbines output are substantial. The Industry quotes that, "at an ambient temperature of 100° F. (38° C.) and 30% relative humidity, it is possible to achieve a power increase of 11% to 24% just by cooling the combustion intake air", without indicating any specific temperature level U.S. Pat. No. 6,290,487 discloses an invention of fuel injection which uses the pre-heating of fuel strictly as the means to increase fuel flow velocity without regard for the fuel density/combustion air-oxygen ratio change and related efficiency results.

For the purpose of creating an even higher oxygen enhanced combustion air/fuel mixture, but without the requirement for any additional energy to perform such task, the present invention employs a different set of unique circumstances.

To effect combustion efficiency and a noticeable reduction in harmful flue gas emission, a combustion burner will respond favorably to any increase in ratio of oxygen/ combustion air mass versus fuel mass in the mixture which is delivered to its burner nozzle for ignition. The most significant ratio change may be obtained through the combination of constantly elevating the fuel pre-combustion temperature level while at the same time maintaining or even reducing the combustion air temperature level. The increased fuel temperature level must not be as high as to approach the flash point temperature of the fuel, as this would interfere with the function of the burner orifice, resulting in a loss of combustion efficiency which would be contrary to the teaching in this disclosure. The most advantageous operating condition, according to the present invention, would provide the highest possible fuel temperature is in combination with the lowest possible combustion air temperature. This will significantly effect the fuel mass to combustion air mass ratio while maintaining constant fuel volume versus combustion air volume ratio flow rates.

In colder climates, and during periods of the year when space heating appliances are usually in operation, fuel stored in storage tanks and fuel transported in conduits exposed to the elements for considerable distances, remains at a density level well above the optimal contemplated operating density range, and pre-heating fuel economically, together with using combustion air drawn from a cool source, could provide significant combustion advantages for both fuel gas and fuel oil applications. Even appliances operating during the summer period, such as gas fired cooling appliances or residential, commercial and industrial water and process heaters, smelting and refractory furnaces and generator turbines, may operate more efficiently with the fuel/ combustion air density ratio change method and device.

It is an established fact that most fluid hydrocarbon fuels may have their density reduced by approximately 1% for each 5 degrees Fahrenheit of fuel temperature increase. Therefore, in a condition where such fuel is delivered to the burner mechanism at a low temperature, especially when reaching levels below 35 degrees Fahrenheit, fuel preheating, especially at a temperature reaching 900 degrees Fahrenheit, would automatically result in a significant reduction of fuel density of up to 180% while maintaining the same fuel mass. This would obviously result in a significant increase in the available oxygen in the relative combustion air mass, as both combustion air and fuel flow volumes remain constant.

Therefore, such reduced density fuel delivered to the burner orifice arrangement at equal volume but reduced fuel mass, would produce significantly more intense and complete combustion reactions due to higher flame speed and higher flame temperature, with the expanded lower density fuel allowing for a more improved, rapid and complete fuel/oxygen mix with advanced ignition, especially when the density of the combustion air is further increased through cooling.

It therefore stands to reason that such a simple method and device, which provides economical means for energy efficient fuel density reduction for the purpose of changing the fuel to combustion air density/oxygen ratio mix to improve combustion, would be most desirable.

At present, it is still believed in the gas combustion appliance industry that pre-heating of fuel, as contemplated in this invention, is not affective to cause a fuel ignition improvement and thereby increase combustion dynamics. In fact, a correction formula is always employed in the industry to eliminate any variance in fuel efficiency calculations due to a change in fuel temperature or fuel density. Such correction formula calculation may be found in the "Gas Engineers Handbook", Ninth Printing, Chapter 8, "Gas Calorimetry", Pages 6–42.

Therefore, the method and device as disclosed in the present invention is completely contrary to industry norm, and is not at all obvious.

SUMMARY OF THE INVENTION

The invention therefore discloses a method and device providing the present effect of reducing fuel density while at the same time maintaining or increasing combustion air density such as to significantly change the ratio of fuel mass versus combustion air mass. This provides a much improved method over the process considered with automotive natural gas combustion engines, employing only a combustion air intercooler. The present combination effect is generally achieved by pre-heating natural gas or propane gas, or other conventional fluid hydrocarbon fuels, as it is delivered to the mechanism's burner manifold, while at the same time maintaining or reducing combustion air temperature when operation today's typical residential, commercial and industrial combustion mechanisms and appliances incorporating a burner arrangement located in a combustion zone. This method is able to provide a significant amount of combustion dynamics improvement while at the same time reducing harmful flue gas emissions.

The present method incorporates a device, which is able to rely solely on heat, or waste heat, generated by the combustion mechanism as heat source for such fuel density reduction operation, consisting of the following basic components.

It comprises a fuel supply conduit defining a heat exchanger assembly, located in the mechanism's manifold area near or beyond the mechanism's fuel flow control valve, should the mechanism be so equipped, through which the fuel is routed on its way to the mechanism's burner nozzle arrangement. This heat exchanger assembly is located in a heating zone which employs heat from the mechanism's combustion area or adjacent the mechanism's interior flue gas vent area. Where access to any of such heat source locations is difficult, the heating zone may employ heat from a heat source unrelated to the mechanism. The size of the heat exchanger assembly and the volume of fuel it is able to pre-heat prior to combustion is relative to the required fuel flow velocity, and the larger the fuel volume, the less dense the fuel and the higher the fuel flow velocity. The heat exchanger assembly may in certain applications incorporate a heat equalizer segment from heat storage material, as part of the heat exchanger assembly, in order to equalize heat transfer from the heating zone to the heat exchanger during the on/off cycles of the combustion mechanism. To prevent the fuel temperature from rising to a range above the fuels' flash point or vaporization level, the heat exchanger configuration is designed to accommodate fuel flow such as to control delivery of fuel to the mechanism's burner orifice at a constant and pre-set desired optimal operating temperature range of between 125 and 900 degrees Fahrenheit, should the heating zone be subject to drastic temperature fluctuations. The contemplated general fuel operating temperature however must range somewhere between above 100 degrees Fahrenheit and a temperature just below the fuel's flash point level or it's vaporization temperature, as the case may be. This is especially desirable for application to mechanisms located outside, or equipment like commercial rooftop furnaces, smelting furnaces and the like, where the heat exchanger may be situated in a heating zone adjacent the interior flue gas vent area of the appliance, exposed to high flue gas temperatures. The outside ambient temperature, which of course controls the operating mode and cycle of the typical residential or commercial hot air mechanisms by way of the mechanism's thermostat setting, would therefore also become a part of this fuel temperature balancing and combustion air temperature control means.

The device operates according to the following method.

Fuel is routed from the incoming general fuel supply conduit past the combustion mechanism's operating valve through a fuel supply conduit defining a heat exchanger assembly, which is located in a heating zone generated by the mechanism, directly to the burner within the combustion zone of the mechanism. During the mechanism's operation, heat is transferred to the heating zone, which may be located adjacent the combustion area or flue gas exit area of the mechanism or adjacent an alternate heat source area, pre-heating the fuel passing through the heat exchanger assembly located in said heating zone. In order to control the pre-selected fuel operating temperature, various means may be employed. The preferred means my rely on the dimensions of the heat exchanger assembly, its effect on fuel volume and flow velocity, it's distance in relation to the heat source operating the heating zone, and the operating cycles of the combustion mechanism.

Another means may employ a heat storage material as part of the heat exchanger assembly, surrounding at least in part the heat exchanger assembly, thereby assisting in the control of the desired fuel operating temperature level by equalizing heat transfer to the fuel during the on/off cycle of the mechanism and the related high/low temperature exposure of the fuel as it is passing through the heat exchanger assembly. Yet a further means may employ a combination of means as heretofore described.

A similar effect may be achieved for applications to some mechanisms, from which heat for pre-heating may not be economically extractable, by employing a device which preheats fuel by using a separate heat source other than a heat source related to the mechanism's combustion zone, such as an electrical resistor element. Such heat source could then be adjusted to control the desired fuel temperature level in order to reduce fuel density to an optimal level.

Results obtained during tests conducted with liquid propane gas and natural gas, supplied with a relative density level reduction versus combustion air density in a typical combustion mechanism, have demonstrated the advantages of the contemplated method and device.

For a better understanding of the present invention and how the disclosed device in accordance with the before described method of operation will result in the herein detailed combustion efficiency improvement and emission reduction, reference should be had to the drawings and descriptive matter in which there are illustrated and described the preferred embodiments of the invention. However, while only a few embodiments of the invention have been illustrated and described, it is not intended to be limited thereby but only by the scope of the appended claims.

DETAILED DESCRIPTION OF A PREFERRED EMBODIMENT

Figure 1:
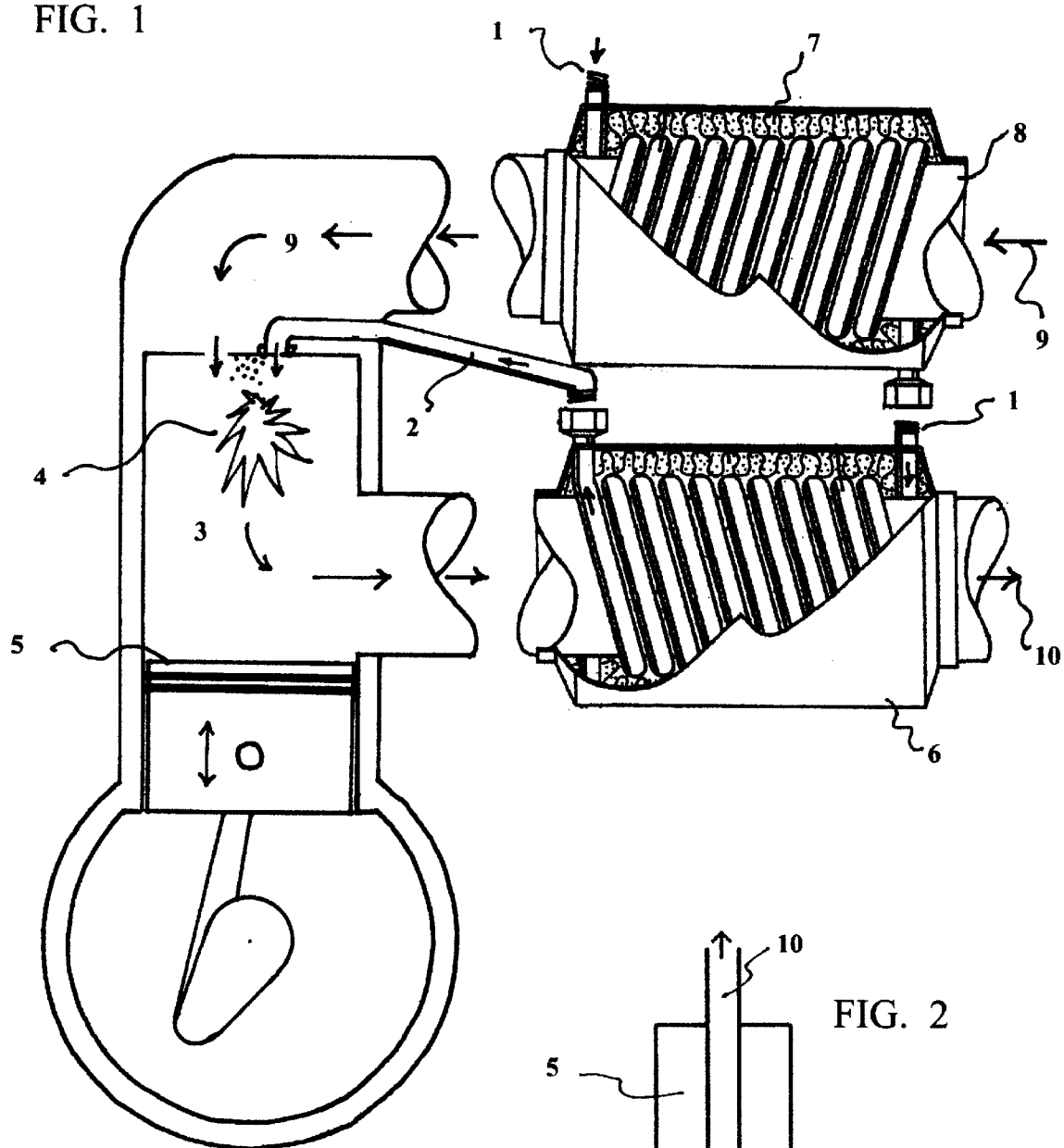
FIG. 1 of the drawings appended hereto depicts a schematic view of a combustion mechanism with a burner arrangement in a combustion area, with in line routed heat exchangers at the combustion air inlet area and at the flue exhaust area.

Referring now to FIG. 1 of the drawings, there is shown, in schematic view, a combustion mechanism with a burner arrangement 4 located in combustion area 3. Incoming fuel is routed through fuel conduit 1 to the first heat exchanger 7 for the purpose of increasing the density of the combustion air 9 flowing through air inlet duct 8 for mixing with fuel at ignition in burner area 4. The fuel is then routed from the first heat exchanger 7 through the second heat exchanger 6, designed for the purpose reducing the density of the fuel using waste heat from the combustion mechanism's flue stack area 10. The density reduced fuel is then routed through an insulated conduit 2 to combustion area 3 for mixing with the density increased combustion air at ignition in burner area 4. The fuel in this application is employed to provide the density increasing means at heat exchanger 7 for improving oxygen mass in the combustion air 9. This is especially feasible when a fuel like liquid natural gas or propane and the like is used, which flows at low temperature and converts to a gaseous state at even lower temperature. Location 5 in the combustion mechanism always indicates the theoretical energy transfer or working area of the combustion mechanism.

Figure 2:
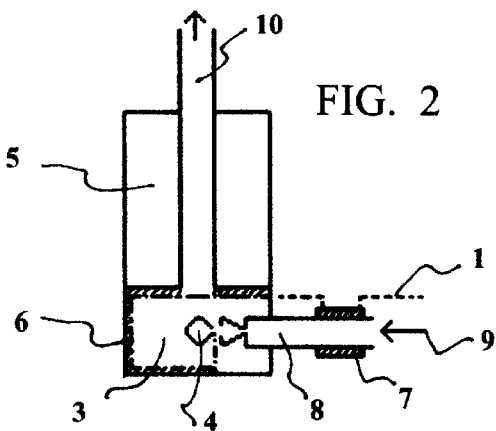
FIG. 2 of the drawings appended hereto depicts a schematic view of a combustion mechanism with a burner arrangement in a combustion area, with in line routed heat exchangers at the combustion air inlet area and at the interior of the combustion area FIG. 3 of the drawings appended hereto depicts a schematic view of a combustion mechanism with a burner arrangement in a combustion area, with separately routed heat exchangers at the combustion air in let area and at the flue exhaust area.

In FIG. 2 of the drawings, there is shown again, in schematic view, a combustion mechanism with a burner arrangement 4 located in combustion area 3. Incoming fuel is routed again through fuel conduit 1 to the first heat exchanger 7 for increasing combustion air density. From this location the fuel is routed through the second heat exchanger 6 which is now located adjacent the combustion area 3 of the combustion mechanism. This heating zone location allows for higher fuel heat exchange temperatures, resulting in maximum fuel density reduction.

Figure 3:
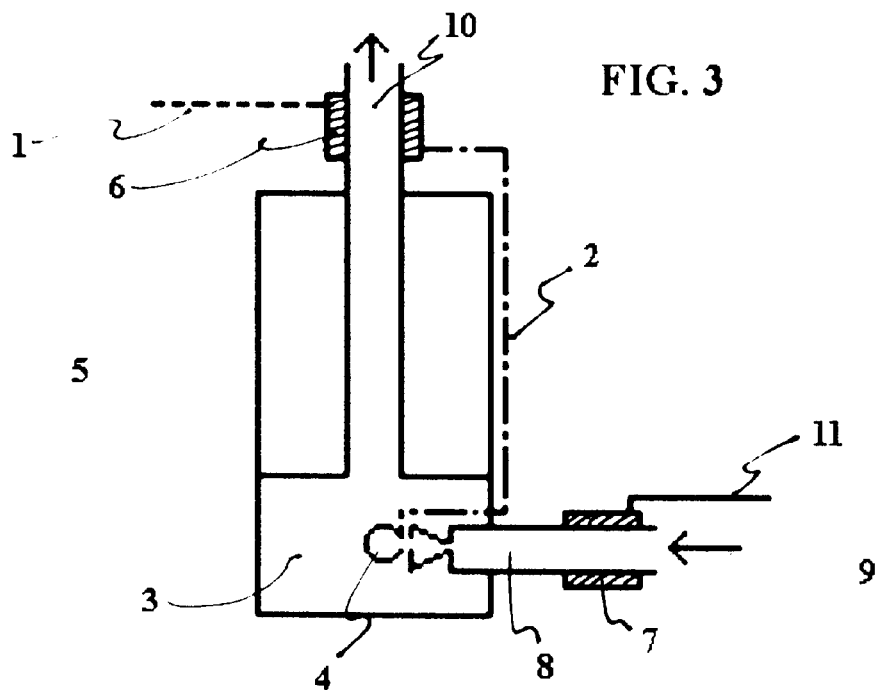

In FIG. 3 of the drawings is shown a further schematic view of a combustion mechanism with a burner arrangement 4 located in combustion area 3. The incoming fuel is now routed through conduit 1 directly to heat exchanger 6 from where it flows density reduced through insulated conduit 2 for mixing with combustion air and ignition at burner arrangement 4. The combustion air 9 is now cooled by independent means at heat exchanger 7 connected to separate energy supply 11 such as to increase the density of air flowing through air duct 8 for mixing with fuel and ignition at burner arrangement 4.

Figure 4:
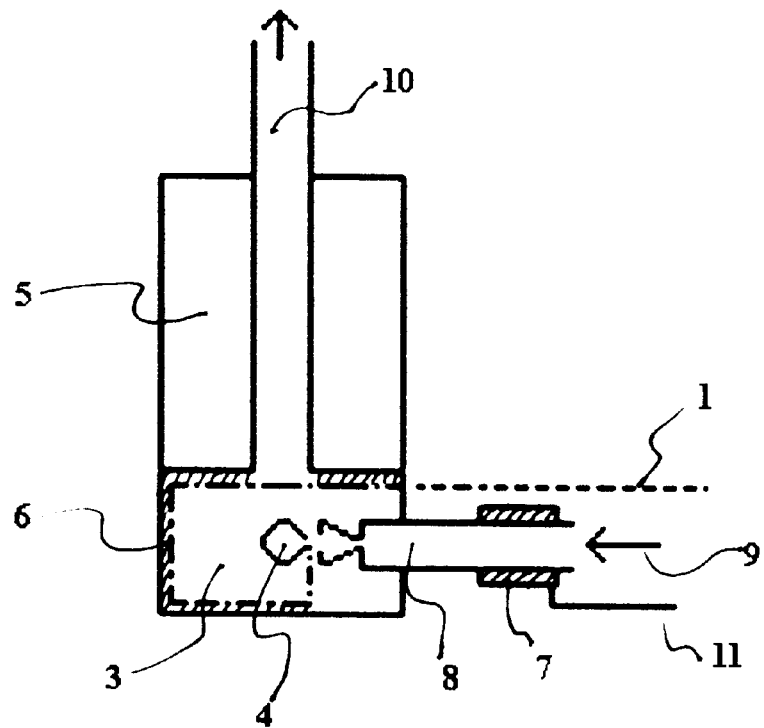
FIG. 4 of the drawings appended hereto depicts a schematic view of a combustion mechanism with a burner arrangement in a combustion area, with separately routed heat exchangers at the combustion air inlet area and at the interior of the combustion area

In FIG. 4 of the drawings is shown another schematic view of a combustion mechanism with a burner arrangement 4 located in combustion area 3. The incoming fuel is in this version routed through conduit 1 to heat exchanger 6, which is now located adjacent the combustion area 3 of the combustion mechanism, from where the density reduced fuel flows to burner arrangement 4 for mixing with density increased combustion air and ignition. The combustion air 9 has the density increased by independently operated heat exchanger 7 connected to power supply 11 providing the air density increasing means for the combustion air flowing through air duct 8 before mixing with fuel and ignition at burner arrangement 4.

Devices according to the present invention may be manufactured using established manufacturing techniques and components known in the art, and such devices may then be attached to any combustion mechanism operating with natural gas, propane gas, fuel oil or any other conventional fluid hydrocarbon fuel, and may be operated in accordance with the method as disclosed herein.

It must be noted that only a few embodiments of the invention have been illustrated and described and that this disclosure is not intended to be limited thereby but only by the scope and intent of the appended claims.

I claim:

1. A method for improving the combustion efficiency of a combustion mechanism operating with fluid hydrocarbon fuel, having an ignition and combustion area therein to convert said fuel into heat, thrust, torque or other type of energy, resulting in the reduction of fuel consumption and harmful emissions without effecting performance output of the combustion mechanism, comprising:
    a) providing a constant volume of ambient temperature fluid hydrocarbon fuel as fuel for said combustion mechanism;
    b) directing said constant volume of fuel through a primary fuel supply conduit defining a heat exchanger assembly that extends through a heating zone having a fuel inlet and a fuel outlet;
    c) reducing fuel density by reducing fuel mass in said constant volume of fuel through heating the fuel to an optimal operating temperature of between 100 degrees Fahrenheit and the fuel's flash point temperature as it flows through said fuel heat exchanger assembly;
    d) maintaining a constant volume of heated low density fuel for ignition in the combustion area of said combustion mechanism;
    e) providing a constant volume of ambient temperature air as combustion air for said combustion mechanism,
    f) directing said constant volume of combustion air through a primary air supply conduit defining a heat exchanger assembly that extends through a cooling zone having an air inlet and an air outlet,
    g) increasing air density by increasing air mass in said constant volume of combustion air through cooling the combustion air to an optimal operating temperature of between ambient and minus 40 degrees Fahrenheit as it flows through said air heat exchanger assembly;
    g) maintaining a constant volume of cooled high density air for combustion in the combustion-area of said combustion mechanism.

2. A method according to claim 1, wherein the density reduction of the fuel is stabilized with an insulating material forming part of the fuel heat exchanger assembly.

3. A method according to claim 1, wherein the fuel heat exchanger assembly is operated with heat from adjacent the exhaust gas area of the combustion mechanism.

4. A method according to claim 1, wherein the fuel heat exchanger assembly is operated with heat from adjacent the combustion area of the combustion mechanism.

5. A method according to claim 1, wherein the fuel heat exchanger assembly is operated with means other than heat from the combustion or exhaust area of the combustion mechanism.

6. A method according to claim 1, wherein the preselected optimal fuel operating temperature level is at a constant range between 155 degrees Fahrenheit and 900 degrees Fahrenheit.

7. A method according to claim 1, wherein the density increase of the cooled combustion air is stabilized with an insulating material forming part of the combustion air heat exchanger assembly.

8. A method according to claim 1, wherein the combustion air heat exchanger assembly is operated with low temperature from the flow of the low temperature fuel supply.

9. A method according to claim 1, wherein the combustion air heat exchanger assembly is operated with means other than the flow of the low temperature fuel supply.

10. A method according to claim 1, wherein the preselected optimal combustion air operating temperature level is maintained at a constant range between plus 30 and minus 30 degrees Fahrenheit.

11. A method according to claim 1, wherein the combustion mechanism is a combustion engine.

12. A method according to claim 1, wherein the combustion mechanism is a mechanism other than a combustion engine.

13. A method according to claim 1, wherein at least one heat exchanger assembly is operational.

14. A combination of devices operational in accordance with the disclosed method for improving the combustion efficiency of a combustion mechanism operating with fluid hydrocarbon fuel, having an ignition and combustion area therein to convert said fuel into heat, thrust, torque or other type of energy, providing the means for the reduction of fuel consumption and harmful emissions without effecting performance output of the combustion mechanism, comprising:

a) a first housing means defining a heating zone;

b) a fuel supply conduit defining a fuel heat exchanger assembly extending through said heating zone, providing the primary conveyance of fuel to the combustion area of the combustion mechanism, having a fuel inlet and a fuel outlet;

c) a fuel heat exchanger assembly to maintain a constant volume of low density fuel supply to the combustion area of said combustion mechanism at a preselected optimal operating temperature range of between 100 degrees Fahrenheit and the fuel's flash point temperature;

e) means to maintain a constant volume of low density heated fuel for combustion in the combustion area of said combustion mechanism;

f) a second housing means defining a cooling zone;

g) a combustion air supply conduit defining a combustion air heat exchanger assembly extending through said cooling zone, providing the primary conveyance of combustion air to the combustion area of the combustion mechanism, having an air inlet and an air outlet;

h) a combustion air heat exchanger assembly to maintain a constant volume of high density cooled combustion air supply to the combustion area of said combustion mechanism at a preselected optimal operating temperature range of between ambient and minus 40 degrees Fahrenheit;

i) means to maintain a constant volume of high density cooled air for combustion in the combustion area of said combustion mechanism.

15. A fuel heat exchanger assembly according to claim 14, wherein the density reduced heated fuel is stabilized with an insulating material forming part of the fuel heat exchanger assembly.

16. A heating zone according to claim 14, wherein the fuel heat exchanger assembly is operated with heat from adjacent the exhaust gas area of the combustion mechanism.

17. A heating zone according to claim 14, wherein the fuel heat exchanger assembly is operated with heat from adjacent the combustion area of the combustion mechanism.

18. A heating zone according to claim 14, wherein the fuel heat exchanger assembly is operated with means other than heat from the combustion or exhaust area of the combustion mechanism.

19. A fuel heat exchanger assembly in a heating zone according to claim 14, designed to heat the fuel to a preselected optimal constant fuel operating temperature level of between 155 degrees Fahrenheit and 900 degrees Fahrenheit.

20. A combustion air heat exchanger assembly in a cooling zone according to claim 14, wherein the density increase of the cooled combustion air is stabilized with an insulating material forming part of the combustion air heat exchanger assembly.

21. A cooling zone according to claim 14, wherein the combustion air heat exchanger assembly is operated with low temperature from the flow of the low temperature fuel supply.

22. A cooling zone according to claim 14, wherein the combustion air heat exchanger assembly is operated with means other than the low temperature of the fuel supply flow.

23. A combustion air heat exchanger assembly in a cooling zone according to claim 14, designed to cool the combustion air to a preselected optimal constant combustion air operating temperature level of between plus 30 and minus 30 degrees Fahrenheit.

24. A combination of devices according to claim 14, wherein the combustion mechanism is a combustion engine.

25. A combination of devices according to claim 14, wherein the combustion mechanism is a mechanism other than a combustion engine.

26. A combination of devices according to claim 14, wherein at least one heat exchanger assembly is operational.

* * * * *